United States Patent
Skeels

(12) 
(10) Patent No.: US 11,274,664 B1
(45) Date of Patent: Mar. 15, 2022

(54) METHOD AND SYSTEMS FOR POSITIVE DISPLACEMENT OF AN ACTUATION DEVICE

(71) Applicant: FMC Technologies, Inc., Houston, TX (US)

(72) Inventor: H. Brian Skeels, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 17/150,004

(22) Filed: Jan. 15, 2021

(51) Int. Cl.
*F03G 7/06* (2006.01)

(52) U.S. Cl.
CPC .................... *F03G 7/065* (2013.01)

(58) Field of Classification Search
CPC ....................................... F03G 7/06
USPC .................................... 60/526–528
See application file for complete search history.

(56) References Cited

U.S. PATENT DOCUMENTS

| | | | |
|---|---|---|---|
| 7,971,651 B2 * | 7/2011 | Tanju .................... | F16K 31/002 166/373 |
| 8,302,696 B2 * | 11/2012 | Williams ................ | E21B 41/00 166/381 |
| 8,992,183 B2 * | 3/2015 | Perich .................. | B01D 61/427 417/50 |
| 9,004,182 B2 | 4/2015 | O'Connor et al. | |
| 9,163,615 B2 | 10/2015 | Williams | |
| 2013/0298549 A1 * | 11/2013 | Manriquez, Jr. .......... | F03G 7/06 60/528 |
| 2014/0069813 A1 * | 3/2014 | Perich ................... | F04B 19/006 204/600 |
| 2018/0027893 A1 * | 2/2018 | Bangera ................ | A63B 71/08 |

* cited by examiner

*Primary Examiner* — Shafiq Mian
(74) *Attorney, Agent, or Firm* — Osha Bergman Watanabe & Burton LLP

(57) ABSTRACT

An actuation device may include a plurality of actuation units disposed about an axis. Each actuation unit of the plurality of actuation units may include a shape memory alloy component, an auxetic material component operationally coupled to the shape memory alloy component, and a power source operationally coupled to the shape memory alloy component. Additionally, the actuation device may include a control system operationally coupled to the power source, the control system is configured to actuate the shape memory alloy component through the power source. Further, when actuated, the shape memory alloy component moves in a direction outward from the axis to pull the auxetic material component, and the auxetic material component expands in a direction perpendicular to the movement direction of the shape memory alloy component.

25 Claims, 12 Drawing Sheets

METHOD AND SYSTEMS FOR POSITIVE DISPLACEMENT OF AN ACTUATION DEVICE

FIELD OF DISCLOSURE

Embodiments disclosed herein relate generally to positive displacement of an actuation device. More particularly, embodiments disclosed herein relate to a shape memory alloy (SMA) being actuated from one position to another position to provide a force.

BACKGROUND

Hydraulics or pneumatics have been used as a power source in many instances where mechanical work (e.g., providing a force) is required over a substantial distance (e.g., inches to feet) over a period of time. Hydraulics allows for the creation of power within a relatively small envelop and reasonable weight (of the actuating device) relative to the component being operated. Typically, a piston open/compressed spring return actuator is used as the actuating device. Additionally, step actuation may be achieved through complex gearing accompanied by two linear piston actuators to drive the mechanism forwards or backwards in steps, requiring a high cycle count of the piston actuator moving back and forth, for each step. In traditional methods to linearly operate equipment, such as gate valves, pneumatic or hydraulic means via a diaphragm or piston is used to exert a linear force to open the valve internals against a differential fluid or gas pressure inside the valve. Other valve internal configurations require a rotating motion to open or close the valve and rely on the same linear motion actuation coupled with a rotating lever arm to generate rotational torque. Return motion may rely on hydraulic or pneumatic pressure being applied to the opposite side of the piston actuator or mechanically via a compressed spring. In the case of metered or flow regulated valves (e.g., chokes), the motion has been via indexing devices such as a ratchet and pawl.

As shown by FIG. 1, a conventional piston open/spring return linear actuator 1 for a gate valve 5 includes a body 2 having a piston 3 slidably disposed therein. The piston 3 may be connected to the valve 5, such that when the piston linearly moves through the body 2, the connected valve 5 may also move between an open and closed position in the valve housing 6. A spring 7 held in the body 2 may provide a force on the piston 3 to move the valve 5 to a closed position (as shown in FIG. 1). Hydraulic lines may be coupled to an inlet 4 of the body 2 to provide power to the piston 3 to move the piston 3 in an opposite linear direction, thereby compressing the spring 7. Once actuated, the piston 3 may move the connected valve 5 to an open position.

As remote offset distances between manned control stations and remote production facilities grow, the transmission of hydraulic power (pressure and flow rate loss through the conduit) grows increasingly difficult and expensive to build, install, and maintain over long lengths. In addition, the size of hydraulic lines carrying the fluid from the source to the actuator becomes more susceptible to physical damage, blockage, or leakage, not to mention the cost to fill and maintain the fluid volume contained within miles of control line. In offshore operations, the efficient use of hydraulic power is further exacerbated by ever increasing water depths that add a static hydraulic head (fluid pressure) which degrades mechanical performance and requires some form of stored energy to compensate for unwanted movement/actuation by the presence of the hydraulic head. For example, as the water depth increases, the unwanted ambient and hydraulic head pressure increase, resulting in the design and manufacture of enormous mechanical springs with very high spring constants that become more susceptible to stress corrosion and fatigue failure over time. Further, hazards during equipment assembly compressing the spring (preload condition) and subsequently being near and working around a substantial amount of stored energy increases.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to an actuation device with a plurality of actuation units disposed about an axis. Each actuation unit of the plurality of actuation units may include a shape memory alloy component, an auxetic material component operationally coupled to the shape memory alloy component, and a power source operationally coupled to the shape memory alloy component. Additionally, the actuation device may include a control system operationally coupled to the power source, the control system is configured to actuate the shape memory alloy component through the power source. Further, when actuated, the shape memory alloy component moves in a direction outward from the axis to pull the auxetic material component, and the auxetic material component expands in a direction perpendicular to the movement direction of the shape memory alloy component.

In another aspect, the embodiments disclosed herein relate to an actuation device with a stack of actuation units having a plurality of actuation units assembled in a side-by-side configuration. Each actuation unit may include a shape memory alloy component and an auxetic material component operationally coupled to the shape memory alloy component. A power source may be operationally coupled to the shape memory alloy component in each actuation unit. The shape memory alloy component and coupled auxetic material component in each actuation unit may have a first position shape when the power source does not provide power to the shape memory alloy component. The shape memory alloy component and coupled auxetic material component in each actuation unit may have a second position shape when the power source provides power to the shape memory alloy component.

In yet another aspect, the embodiments disclosed herein relate to a method. The method may include actuating a shape memory alloy component of one or more actuation units via a power source operationally coupled to the shape memory alloy component; pulling an auxetic material component of the one or more actuation units with a force generated from actuating the shape memory alloy component; expanding the auxetic material component in a direction perpendicular to the force generated by the shape memory alloy component; and displacing the auxetic material component from a first position to a second position to form a stroke length of the one or more actuation units.

In another aspect, the embodiments disclosed herein relate to a method. The method may include providing an actuation device comprising a plurality of actuation units assembled in a side-by-side configuration; actuating a shape memory alloy component of a portion of the actuation units via a power source operationally coupled to the shape memory alloy component; pulling an auxetic material component of the portion of the actuation units with a force generated from actuating the shape memory alloy component; displacing the auxetic material component in the portion of the actuation units from a first position, in a direction perpendicular to the force generated by the shape memory alloy component, to a second position; and maintaining the auxetic material component of a remaining portion of the actuation units in the first position, and displacing the auxetic material component in the portion of the actuation units forms a partial stroke length of the actuation device.

In another aspect, the embodiments disclosed herein relate to a method. The method may include providing an actuation device comprising a plurality of actuation units, each actuation unit having a shape memory alloy component and an auxetic material component; actuating a first stack of the plurality of actuation units to an energized state, the actuating includes: actuating the shape memory alloy component of each actuation unit in the first stack via a power source, pulling the auxetic material component of each actuation unit in the first stack with a force generated from actuating the shape memory alloy component, and displacing the auxetic material component in a direction perpendicular to the force generated by the shape memory alloy component from a first position to a second position; maintaining a second stack of the plurality of actuation units in a rest state, in the rest state, the auxetic material component of each actuation unit in the second stack is in the first position, the second stack is proximate the first stack; turning off the power source of each actuation unit in the first stack to return the auxetic material component of each actuation unit in the first stack to the first position and placing the first stack of actuation units in the rest state; and actuating the second stack of actuation units to an energized state, the actuating includes: actuating the shape memory alloy component of each actuation unit in the second stack via the power source; pulling the auxetic material component of each actuation unit in the second stack with a force generated from actuating the shape memory alloy component; and displacing the auxetic material component in a direction perpendicular to the force generated by the shape memory alloy component from the first position to the second position.

In yet another aspect, the embodiments disclosed herein relate to an actuation device. The actuation device may include a first stack of actuation units with a plurality of first actuation units assembled in a side-by-side configuration. Each of the first actuation units may include a first shape memory alloy component; and a first auxetic material component operationally coupled to the first shape memory alloy component; the first shape memory alloy component and coupled first auxetic material component in each first actuation unit has an expanded shape when a power source does not provide power to the first shape memory alloy component; and the first shape memory alloy component and coupled first auxetic material component in each first actuation unit has a retracted shape when the power source provides power to the first shape memory alloy component. The actuation device may further include a second stack of actuation units with a plurality of second actuation units assembled in a side-by-side configuration. Each of the second actuation units may include a second shape memory alloy component; and a second auxetic material component operationally coupled to the second shape memory alloy component; the second shape memory alloy component and coupled second auxetic material component in each second actuation unit has a second retracted shape when a power source does not provide power to the second shape memory alloy component; and the second shape memory alloy component and coupled second auxetic material component in each second actuation unit has a second expanded shape when the power source provides power to the second shape memory alloy component.

Other aspects and advantages will be apparent from the following description and the appended claims.

DETAILED DESCRIPTION

Figure 1:
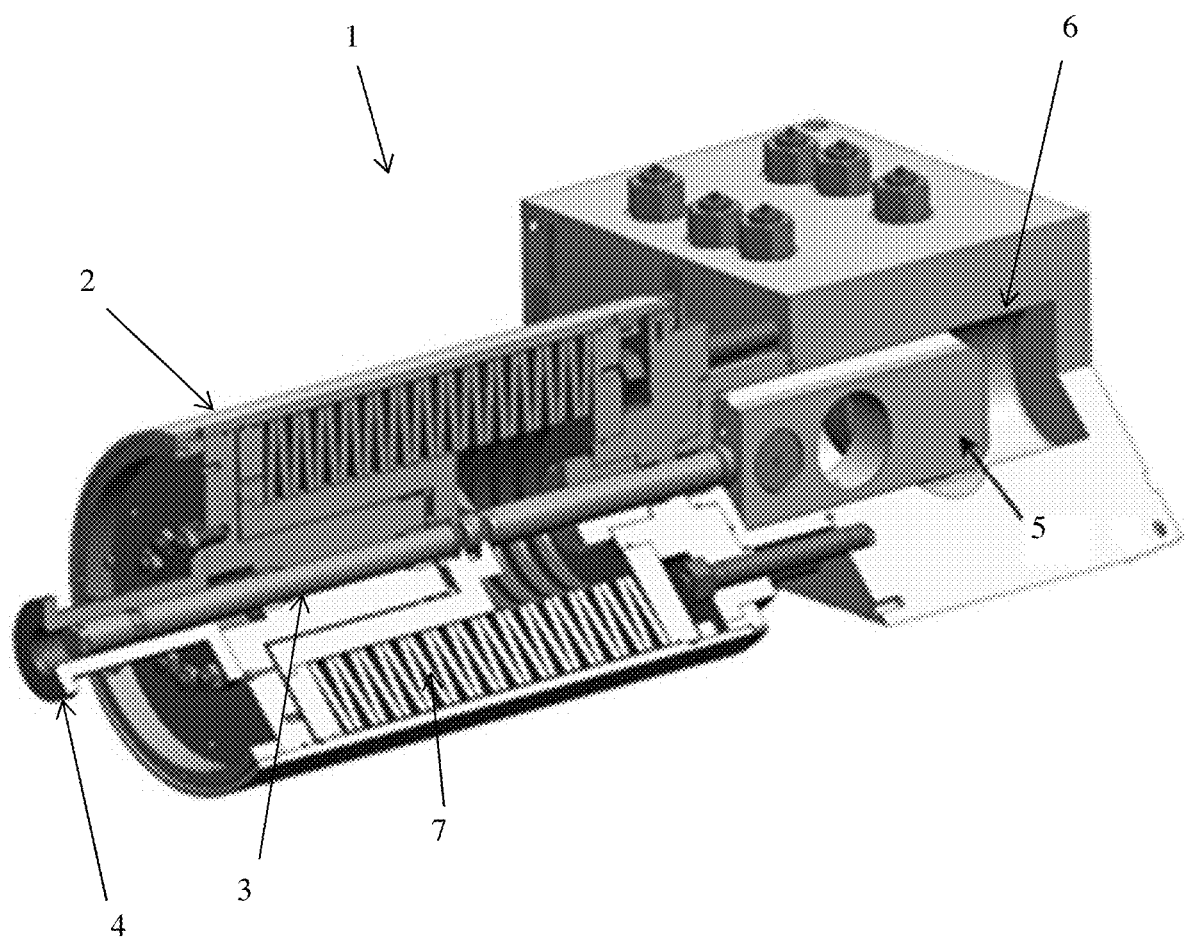
FIG. 1 is a cross-sectional view of a hydraulic actuator in accordance with the prior art.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description. As used herein, the term "coupled" or "coupled to" or "connected" or "connected to" "attached" or "attached to" may indicate establishing either a direct or indirect connection, and is not limited to either unless expressly referenced as such. As used herein, fluids may refer to slurries, liquids, gases, and/or mixtures thereof. Wherever possible, like or identical reference numerals are used in the figures to identify common or the same elements. The figures are not necessarily to scale and certain features and certain views of the figures may be shown exaggerated in scale for purposes of clarification.

Embodiments disclosed herein are directed to methods and systems for actuation of an actuation device to exert a force based on a displacement. More specifically, embodiments disclosed herein are directed to actuation devices including shape memory alloy (SMA) materials operationally coupled to auxetic materials being actuated to displace from one position to another position. The auxetic materials may displace in a direction perpendicular to a direction in which the SMA materials displace.

Auxetic materials may include materials that exhibit a negative Poisson ratio. For example, auxetic materials may have a negative Poisson ratio such as 2:−3, 1:−2, or 2:−5. When a load is applied to auxetic materials, the auxetic material may exhibit a volumetric change in the direction perpendicular to the applied load. For example, when an auxetic material is pulled in a radial direction, the auxetic material may displace outwardly in the axial direction from the radial direction. Examples of auxetic materials include but are not limited to iron pyrite monocrystals, a-cristobalite, cow teat skin, pyrolytic graphite, polymorphic silicones, zeolites, silicates, crystal cadmium, auxetic polyurethane, auxetic variants of polytetrafluorethylene polymers, and crystalline materials of Li, Na, K, Cu, Rb, Ag, Fe, Ni, Co, Cs, Au, Be, Ca, Zn, Sr, Sb, and $MoS_2$. Auxetic materials may be made into a fabric and attached to the SMA material component of an actuation unit.

SMA materials may be selected from alloys that deform between two remembered shapes when electrically energized or activated by temperature. Examples of SMAs include but are not limited to nickel alloys such as copper-aluminum-nickel (CuAlNi) alloys and nickel titanium (NiTi) alloys, and possibly iron-based alloys, copper-based alloys, zinc alloys, and gold alloys. Two state shapes may be remembered by the molecular lattice of the SMA, which changes from one crystalline configuration to the second crystalline configuration.

The different embodiments described herein may provide methods and systems for a compact, scalable actuation assembly that plays a valuable and useful role in actuation operations. By using the methods and systems of an actuation device including SMA materials and auxetic materials, flow control device actuation operations may be streamlined and eliminate the need for costly hydraulic power units. Further, a configuration and arrangement of the SMA materials and the auxetic materials within the actuation device according to one or more embodiments described herein may provide a cost-effective alternative to conventional methods used in actuation operations. For example, one or more embodiments described herein may eliminate the need for large stored energy devices, such as batteries or compressed springs, and other costly actuation equipment at work sites conventionally used in actuation operations. The embodiments described herein may be useful in various applications for different industries such as oil and gas, medical, automotive, aerospace, robotics, manufacturing, construction, and defense/military, for example, and are not limited to any specific application details of the embodiments disclosed herein.

In accordance with one or more embodiments, an actuation device may include a plurality of actuation disks. Each actuation disk of the plurality of actuation disks may include an SMA material operationally coupled to an auxetic material. In one or more embodiments, the plurality of actuation disks may be in series to form a stack. Further, a power source may be operationally coupled to each actuation disk of the plurality of actuation disks to actuate the SMA material, which in turn actuates the auxetic material. In some embodiments, a control system, such as a computer system having a memory coupled to a processor, may be used to operate the actuation device manually or automatically. Overall, the actuation device may minimize product engineering, minimize risk associated with operators at work sites, reduce assembly time and NPT, reduce hardware cost, and reduce weight and envelope size. Thus, the disclosed actuation device improves safety on site and reduces cost associated with conventional actuation operations.

Actuation devices according to embodiments of the present disclosure may include a plurality of actuation units (e.g., actuation disks) that are each made of an SMA component and an auxetic material component. The actuation units may be arranged in a side-by-side configuration, where in such configuration, the plurality of actuation units may be referred to as being a stack of actuation units. Each actuation unit in a stack of actuation units may be the same type (e.g., having the same size, shape, and material compositions such that each unit generates the same unit amount of displacement when activated), or one or more actuation units in a stack of actuation units may be different (e.g., having a different size, shape, and/or material generating different unit displacements) than another one of the actuation units. When arranged in a side-by-side configuration, each actuation unit may have its auxetic material component arranged adjacent to the auxetic material components of the neighboring actuation units. Further, the SMA components attached to each of the auxetic material components may be arranged to exert a load on the auxetic material components in the same direction, such that when loaded, the auxetic material components may all expand in the same direction (perpendicularly to the load direction).

For example, a stack of actuation units may include a plurality of actuation units each having an SMA component and an attached auxetic material component. The auxetic material components in each actuation unit may be arranged in a side-by-side configuration. Similarly, the SMA component in each actuation unit may be arranged in a side-by-side configuration. The SMA components may be activated to change shape and pull the auxetic material components in the same loaded direction. When pulled in the same loaded direction, the auxetic material components in each actuation unit may then expand along the same displacement direction (perpendicular to the loaded direction). As the auxetic material components expand in the same displacement direction, pushing adjacent auxetic material components outwardly along the displacement direction, the stack of actuation units may also expand. Such expansion may be used as the actuating mechanism in an actuating device. By using the shape change in an SMA component (which can be relatively small) to exert a load on an auxetic material component (which can have a relatively larger displacement than the SMA shape change due to the negative Poisson ratio), the auxetic material component may act as a multiplier for the displacement distance provided by each actuation unit. For example, when using a stack of actuation units to move an actuation component (e.g., a piston or a valve component) in an actuating device, the auxetic material components in at least some of the actuation units in the stack may multiply the degree of movement from shape change in the attached SMA components.

The amount of expansion from the actuation units may be additive, based on the amount of actuation units being activated (via shape change from the SMA components). For example, additional actuation units may be actuated (e.g., by electrically energizing the SMA component in the actuation units) to move an actuation component an additional distance. According to embodiments of the present disclosure, the amount of actuation units in a stack of actuation units that are activated may be tailored to move an actuation component a selected distance. For example, all of the actuation units in a stack of actuation units may be activated to move an actuation component a maximum distance, or some (less than all) of the actuation units in the stack of actuation units may be activated to move the actuation component a relatively smaller distance.

Actuation units may have SMA components and attached auxetic material components configured in different sizes and shapes to move different types of actuation components. For example, as shown in FIGS. 2A-2E, actuation units may be configured in a disk-shape provided around a rod to move a top plate actuation component. As another example, actuation units may have a non-cylindrical shape (e.g., rectangular, square, or polygon shaped plates) and may be stacked at an axial end of a piston actuation component, where activation of one or more of the actuation units may move the piston actuation component. It is further envisioned that, in addition to or in the alternative of using the rod, a linear travel alignment (or guidance) may be accomplished by encapsulating the actuator units and top plate within a hollow cylinder or container with the bore fitting an external shape of the actuation units contained within.

Figure 2A:
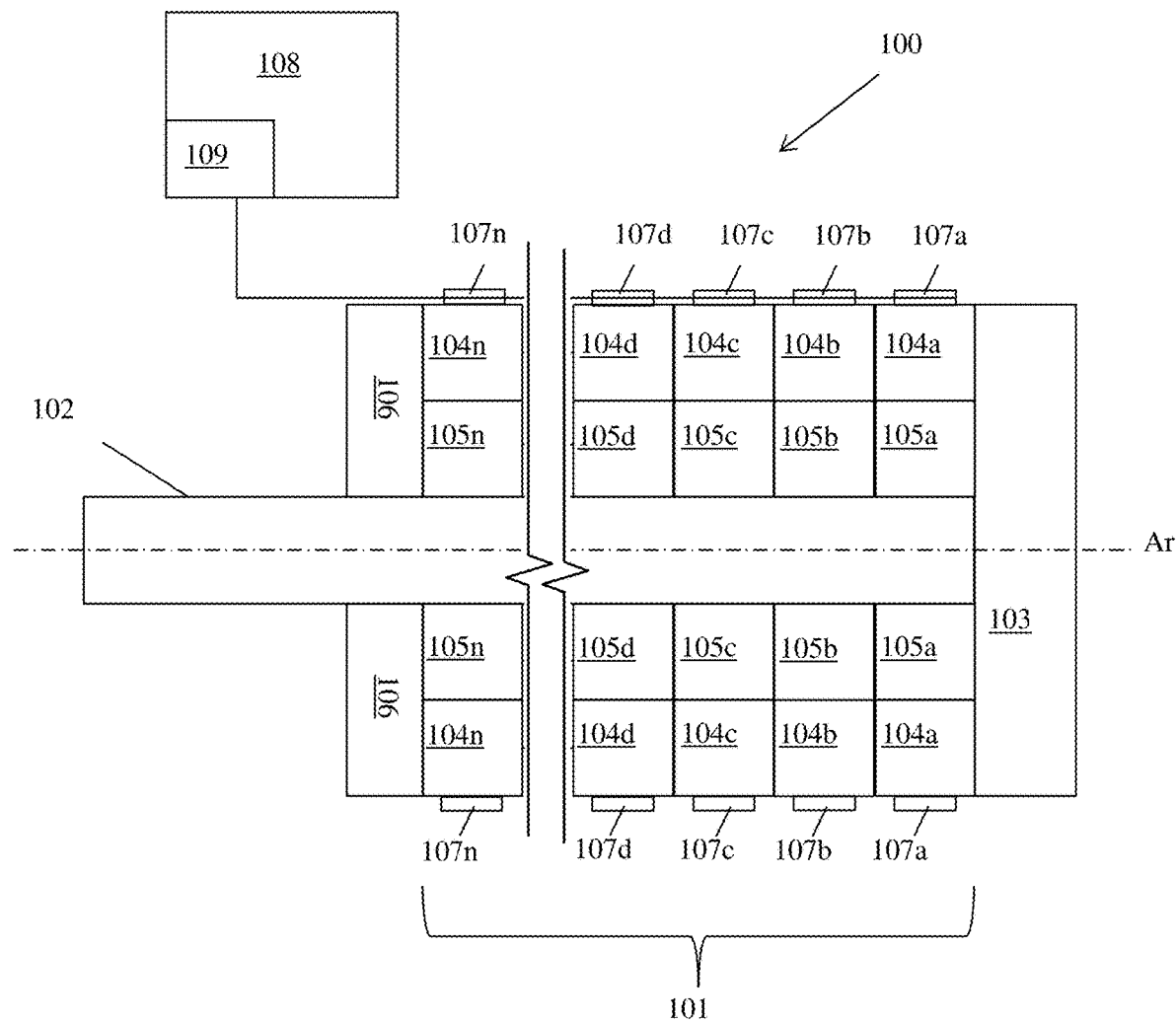
FIGS. 2A-2E illustrate a cross-sectional side view of an actuation device in accordance with one or more embodiments of the present disclosure.

Turning to FIG. 2A, FIG. 2A shows a cross-sectional side view of an actuation device 100 in accordance with one or more embodiments of the present disclosure. In one or more embodiments, the actuation device 100 may include a plurality of actuation units (e.g., actuation disks 101 shown in FIGS. 2A-E) disposed about rod 102 on a back stop 103. The plurality of actuation disks 101 may be coaxial with an axis $A_r$ of the rod 102. The plurality of actuation disks 101 may form a stack of actuation disks (104a-104n, 105a-105n) in series from the back stop 103 to a top plate 106. The stack of actuation disks (104a-104n, 105a-105n) may use any number of actuation disks without departing from the present scope of the invention. The back stop 103 may be fixed to an end of the rod 102 distal to the top plate 106. Additionally, the top plate 106 may slidably move up and down the rod 102 as the plurality of actuation disks 101 actuate against the back stop 103. In a non-limiting example, the rod 102, the back stop 103, and the top plate 106 may be made of a metal material, composite material, insulating material, or a combination thereof. The top plate 106 may be used to engage other devices with the actuation device 100.

In some embodiments, each actuation disk (104a-104n, 105a-105n) may include a shape memory alloy (SMA) component 104a-104n operationally coupled to an auxetic material component 105a-105n. In a non-limiting example, the SMA component 104a-104n may be interweaved or interlocked with the auxetic material component 105a-105n such that the SMA component 104a-104n may either pull or push the auxetic material component 105a-105n. The auxetic material components 105a-105n may have a washer shape with an inner diameter greater than the rod diameter. The SMA components 104a-104n may also have a washer shape with an inner diameter greater than the rod diameter. In such embodiments, the SMA component may be attached at its inner diameter to the outer diameter of the auxetic material component. In one or more embodiments, each actuation disks (104a-104n, 105a-105n) may have a thickness matching a thickness of an adjacent actuation disks. It is further envisioned that each actuation disks (104a-104n, 105a-105n) may also be varied in thickness for additional non-linear growth applications that may be beneficial for operating specialty equipment, such as chokes with unique non-linear flow characteristics.

The SMA component 104a-104n may be an alloy that is shaped in a first position and then displaced to a second position when actuated (e.g., electrically energized or heated) and may then return to the first position upon de-actuation. The alloy of the SMA component 104a-104n may be based in nickel, titanium, zinc, copper, gold, aluminium, iron, or other metal alloys. In some embodiments, the alloy may be a non-metal alloy. The two state positions may be remembered by the SMA material's 104a-104n molecular lattice (e.g., changing from one crystalline configuration to another). Depending on the various positions, the SMA component 104a-104n may generate a tremendous amount of force density in a small area, but with a short stroke. Due to the short stroke, the force density magnitude may be less than what is required to operate large stroke valves. To overcome the short stroke, the SMA component 104a-104n may use the attached auxetic material component as a distance multiplier, much like a third-degree lever that may generate the distance and speed at the sacrifice of some of its force capacity. Because of its inherent short stroke, the SMA component 104a-104n is typically not used in large stroke applications. In large stroke applications, the SMA material 104a-104n may be displaced from the first position to the second position and back (in the same linear direction as the desired motion) to create a linear ratcheting or hydraulic pumping action to effect the multiplied motion.

The auxetic material component 105a-105n may be a material that exhibits a negative Poisson ratio when pulled/stretched such the auxetic material component 105a-105n gets wider as the auxetic material component 105a-105n is pulled. When actuated, the auxetic material component 105a-105n may displace in a direction perpendicular to a direction in which the SMA component 104a-104n displaces. With such a configuration, the SMA component 104a-104n is out of the way of the desired linear path when actuated such that the SMA component 104a-104n and the auxetic material component 105a-105n work in parallel. By using the mechanical strength of the SMA component 104a-104n to pull on the auxetic material component 105a-105n, the auxetic material component 105a-105n grows fatter and expands in a side-by-side direction.

In one or more embodiments, each actuation disk (104a-104n, 105a-105n) may include a power source 107a-107n operationally coupled to the SMA component 104a-104n. The power source 107a-107n may acuate the SMA component 104a-104n, which in turn actuates the auxetic material component 105a-105n. The power source 107a-107n may be mechanical, acoustic, thermal, hydraulic, chemical, electro-magnetic, nuclear, or a combination thereof. In a non-limiting example, the power source 107a-107n may be individually wrapped around each actuation disk (104a-104n, 105a-105n).

Still referring to FIG. 2A, in one or more embodiments, a control system 108 may be operationally coupled to each power source 107a-107n, wirelessly or wired. The control system 108 may be a computer system with a memory coupled to a processor for implementing methods disclosed herein. The computer system may include a human machine interface ("HMI") 109 using a software application and may be provided to aid in the automation or manual monitoring and operating of the actuation device 100. In some embodiments, the HMI 109, such as a computer, control panel, and/or other hardware components may allow an operator to interact through the HMI 109 with the actuation device 100. The HMI 109 may include a screen, such as a touch screen, used as an input (e.g., for a person to input commands) and output (e.g., for display) of the computing system. In some embodiments, the HMI 109 may also include switches, knobs, joysticks and/or other hardware components which may allow an operator to interact through the HMI 109 with the actuation device 100.

In some embodiments, the control system 108 may be used for operational monitoring of displacement distance of the SMA component 104a-104n and the auxetic material component 105a-105n, energy harvesting, and/or equipment performance and damage, for example. It is further envisioned that the control system 108 may be in communication with a plurality of sensors, such as a microphone, ultrasonic, ultrasound, sound navigation and ranging (SONAR), radio detection and ranging (RADAR), acoustic, piezoelectric, accelerometers, temperature, pressure, weight, position, or any sensor in the art to detect and monitor, for data acquisition on the actuation device 100. The plurality of sensors may be disposed on or provided within any of the various components of the actuation device 100.

In FIG. 2A, the actuation device 100 is in a non-extended position. In the non-extended position, each actuation disk (104a-104n, 105a-105n) in the stack of actuation disks 101 may be in a first position. In the first position, both the SMA component 104a-104n and the auxetic material component 105a-105n are in a rested state (i.e., the power source 107a-107n is turned off) such that neither the SMA component 104a-104n nor the auxetic material component 105a-105n is actuated.

Figure 2B:
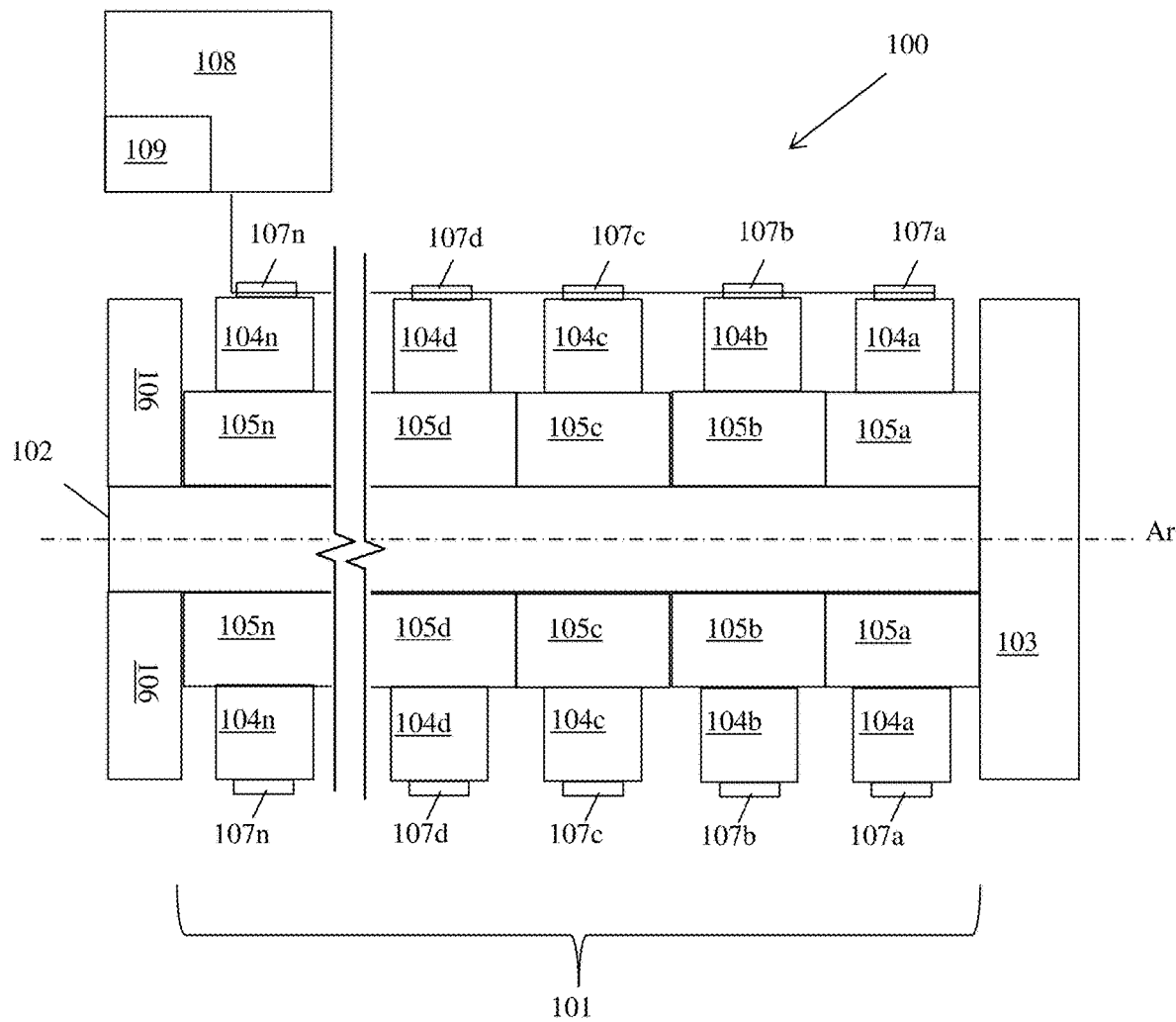

Now referring to FIG. 2B, the actuation device 100 of FIG. 2A is shown in a fully extended position. A distance between the fully extend position in FIG. 2B and the non-extended position in FIG. 2A may be a full stroke length of the actuation device 100. In the fully extended position, each SMA component 104a-104n in each actuation disks (104a-104n, 105a-105n) is actuated by the power source 107a-107n. In a non-limiting example, the power source 107a-107n may be turned on to provide a level of power to fully extend the stack of actuation disks 101 such that the each actuation disk (104a-104n, 105a-105n) is in a second position. When actuated, each SMA component 104a-104n is displaced in a direction outward from the rod 102. In a non-limiting example, each SMA component 104a-104n displaces perpendicular to the axis $A_r$ of the rod 102. As the SMA component 104a-104n displaces outward, the SMA component 104a-104n may pull the auxetic material component 105a-105n. With the SMA component 104a-104n applying a pulling force, the auxetic material component 105a-105n stretches and grows thicker and expands linearly along the axis $A_r$ of the rod 102 in a parallel direction. By having such an expansion of the auxetic material component 105a-105n, each actuation disk (104a-104n, 105a-105n) may have a short and powerful stroke. With each actuation disk (104a-104n, 105a-105n) stacked upon each other, a stroke length of the stack of actuation disks 101 may be a collective stroke length of each actuation disk (104a-104n, 105a-105n). In a non-limiting example, if each SMA component 104a-104n pulls 0.05 inches (in a radial direction from the rod 102), and the auxetic material component 105a-105n has a 1:−2 Poisson ratio, then each actuation disk (104a-104n, 105a-105n) would expand roughly 0.1 inches in thickness (via the axial expansion of the auxetic material component). Therefore, if the stack of actuation disks 101 has ten actuation disks (104a-104n, 105a-105n), the collective stroke length of the stack of actuation disks 101 would be 1.0 inch, if the stack has 50 actuation disks, the collective stroke length of the stack would be 5 inches, and so on. In such manner, actuation units according to embodiments of the present disclosure may be stacked together to collectively provide a relatively longer stroke length than if SMA materials alone were used as the actuation mechanism.

In one or more embodiments, the actuation device 100 may be operated to move the stack of actuation disks 101 in a reciprocating manner such as a piston. In a non-limiting example, the control system 108 may actuate, via the power source 107a-107n, each actuation disk (104a-104n, 105a-105n) to move back and forth from the first position (see FIG. 2A) to the second position (see FIG. 2B). Further, the control system 108 may control a speed at which the stack of actuation disks 101 reciprocates. In a non-limiting example, the control system 108 may control a level of power at which the power source 107a-107n introduces a power into the SMA component 104a-104n. By controlling the level of power, the control system 108 may regulate the speed at which the stack of the plurality of actuation disks 101 reciprocates.

Figure 2C:
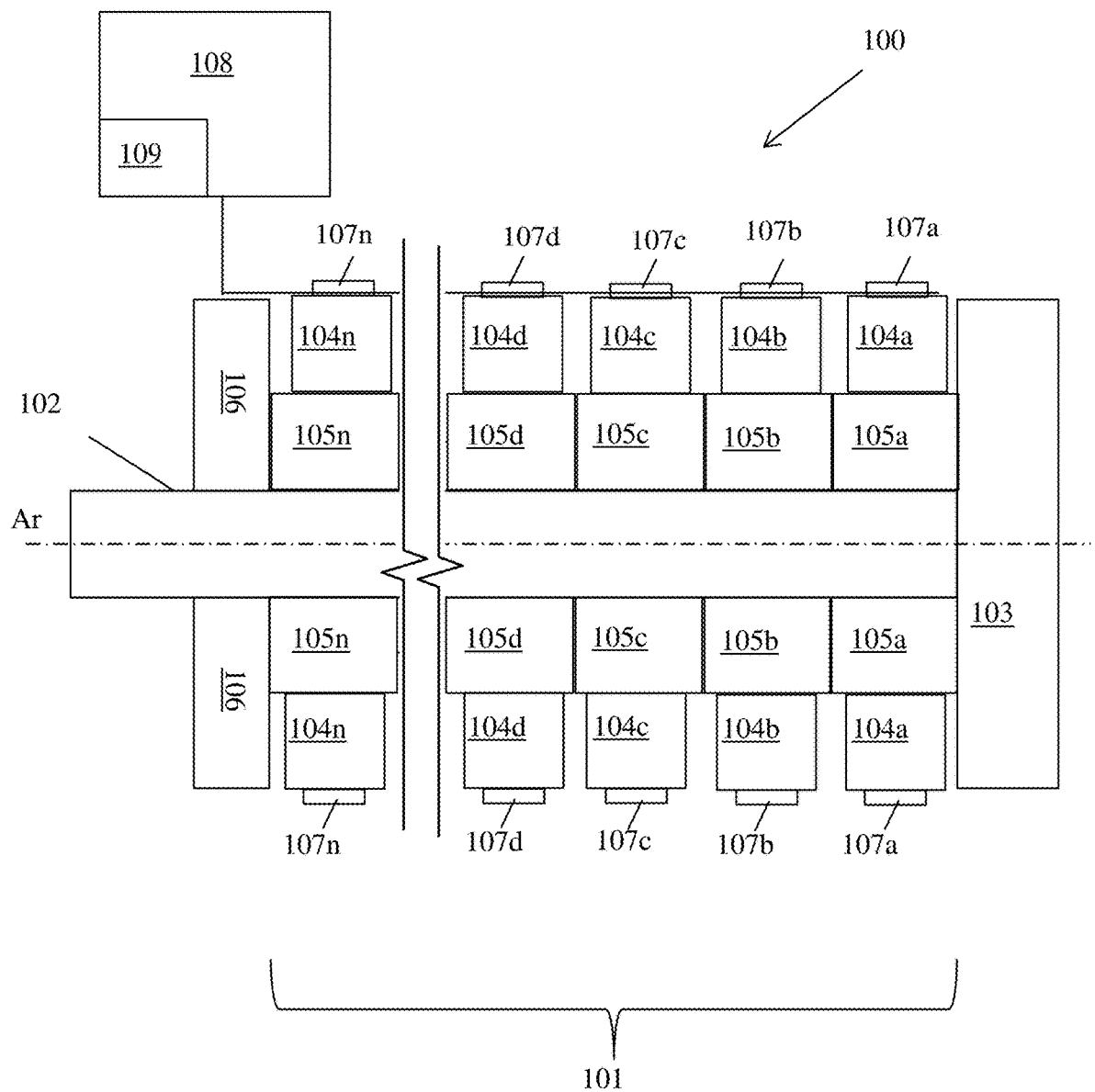
Figure 2D:
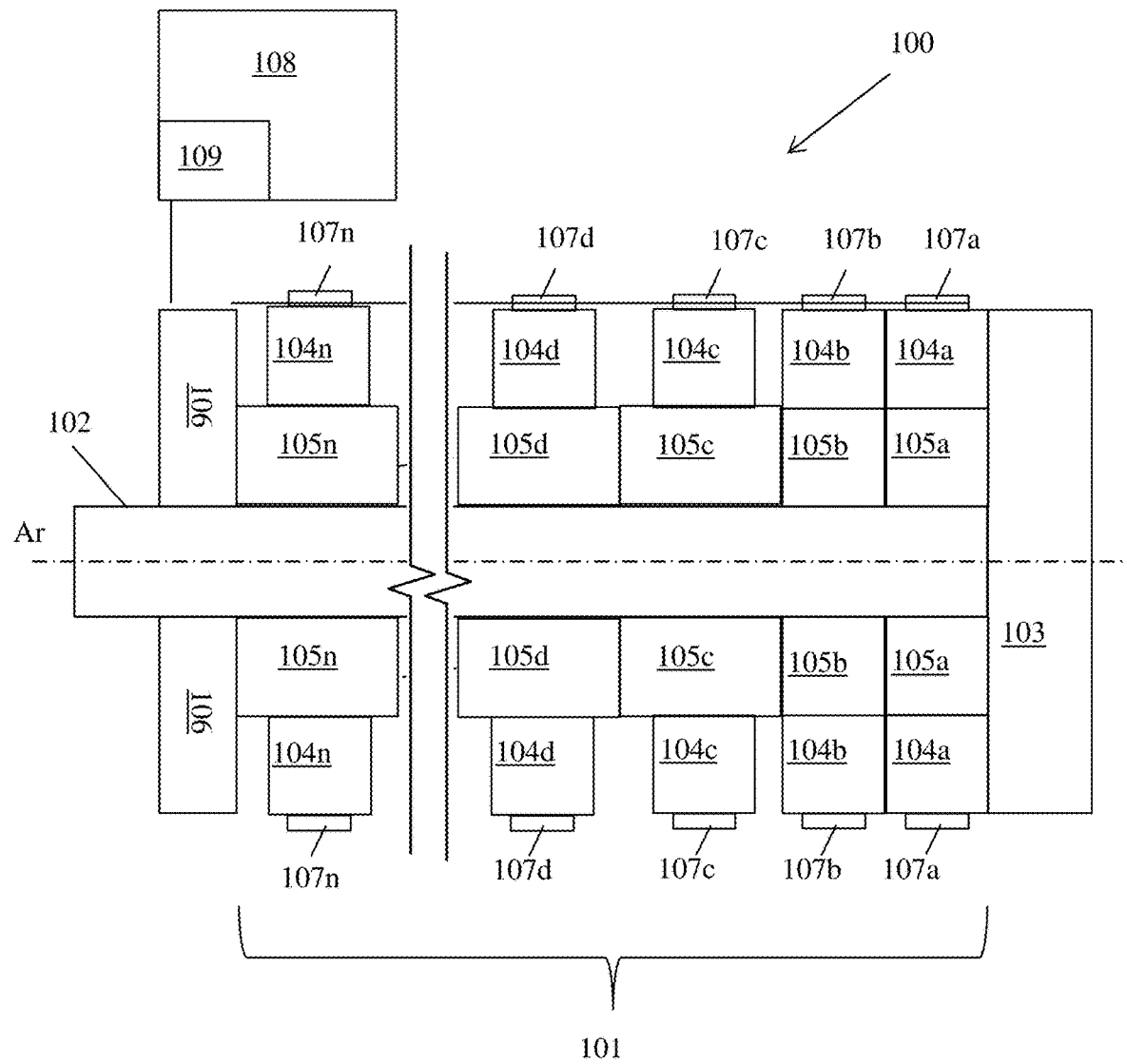

In some embodiments, the actuation device 100 may be operated to perform a stepping or partial stroke, as shown by FIGS. 2C and 2D. Referring to FIG. 2C, each actuation disk (104a-104n, 105a-105n) in the stack of actuation disks 101 may be actuated to be in a third position. The third position may have an axial length between that of the first position and the second position. In the third position, the power source 107a-107n may operate at level below the level that actuates each actuation disk (104a-104n, 105a-105n) into the second position. By operating at a lower power level, the SMA components 104a-104n pull a distance less than the distance in the second position to perform a stepping or partial stroke in each actuation disk (104a-104n, 105a-105n).

For example, the power source 107a-107n may provide power at a first level to each SMA component 104a-104n in the stack of actuation disks 101, which may cause the SMA components 104a-104n to move a first radial distance outwardly from the rod 102, thereby pulling the attached auxetic material components 105a-105n in the radial direction and causing the auxetic material components 105a-105n to expand a first axial distance in a perpendicular direction (i.e., in the axial direction parallel with the rod 102). The power source 107a-107n may also provide power at a second level to each SMA component 104a-104n in the stack of actuation disks 101, which may cause the SMA components 104a-104n to move a second radial distance outwardly from the rod 102, thereby pulling the attached auxetic material components 105a-105n in the radial direction and causing the auxetic material components 105a-105n to expand a second axial distance in a perpendicular direction from the movement of the SMA components (in the axial direction parallel with the rod 102). The second power level may be greater than the first power level, causing the second axial distance of the auxetic material components 105a-105n to be greater than the first axial distance, and thereby providing a longer collective stroke length of the stack of actuation disks 101.

In some embodiments, a stepping or partial stroke may be conducted by activating less than all of the actuation units in a stack of actuation units. For example, a partial amount of actuation units may be activated to provide a corresponding partial stroke (e.g., activating 50% of the actuation units to provide a half stroke, activating 20% of the actuation units to provide a fifth stroke, etc.).

Now turning to FIG. 2D, in one or more embodiments, the stepping or partial stroke of the actuation device 100 may be performed by actuating only some of the actuation disks (104a-104n, 105a-105n) while the remaining actuation disks (104a-104n, 105a-105n) stay in the first position. In a non-limiting example, the actuation disks 104c-104n, 105c-105n may be actuated to the second position while the actuation disks 104a-104b, 105a-105b may remain in the first position to perform the stepping or partial stroke of the actuation device 100. The partial amount of actuation disks (104c-104n, 105c-105n) actuated to the second position may be actuated, for example, by sending power individually to the activated actuation disks (104c-104n, 105c-105n) while not sending power to the actuation disks (104a-104b, 105a-105b) in the first position. By selectively sending power to individual actuation disks, the control system 108 may be used to actuate the stack of actuation disks to specifically selected collective stroke lengths. For example, the control system 108 may send power to all of the actuation disks in a stack of actuation disks to provide a maximum collective stroke length, the control system 108 may send power to half of the actuation disks in a stack of actuation disks to provide a collective stroke length that is half of the maximum collective stroke length, the control system 108 may send power to ⅓ of the actuation disks in a stack of actuation disks to provide a collective stroke length that is ⅓ of the maximum collective stroke length, and so forth. Further, when actuation disks of different auxetic displacements are stacked together, the stepping or partial stroke may be customized to generate a plurality of non-linear stroke lengths to fit specific design load and displacement applications.

Figure 2E:
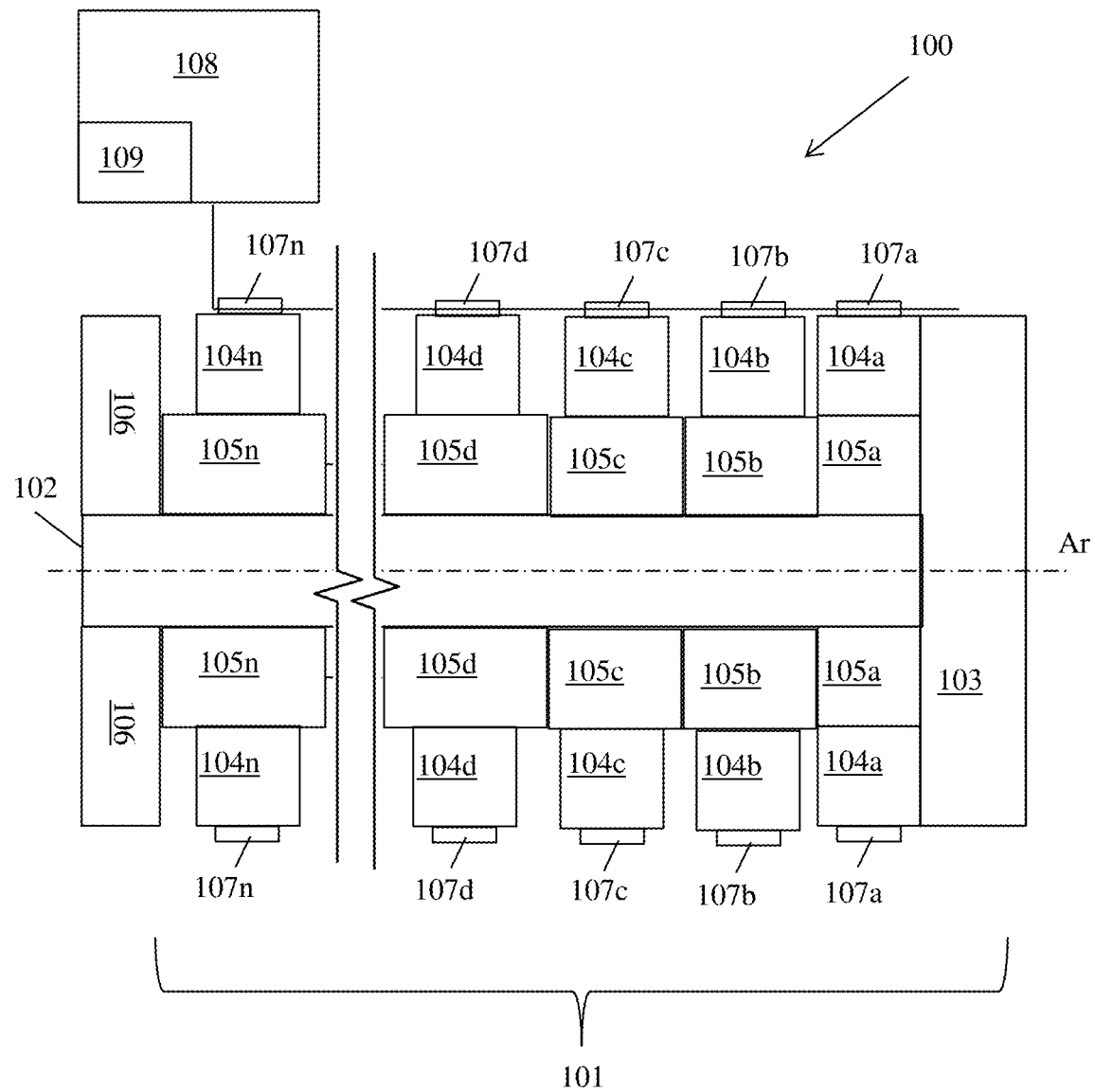

In one or more embodiments, the actuation device 100 may be operated to move the stack of actuation disks 101 to a fully extended position (a maximum collective stroke length) in a cascading stroke as shown in FIG. 2E. In the cascading stroke, various actuation disks (104a-104n, 105a-105n) may be at different positions (e.g., first to third positions). In a non-limiting example, the actuation disk 104a, 105a may be at the first position while the actuation disks 104b-104c, 105b-105c may be at the third position and the actuation disks 104d-104n, 105d-105n may be at the second position. One skilled in the art will appreciate how the actuation device 100 may provide a quick and fast actuation to engage other devices as well as eliminate the need for the use of a ratchet and pawl mechanism in conventional methods.

Figure 3A:
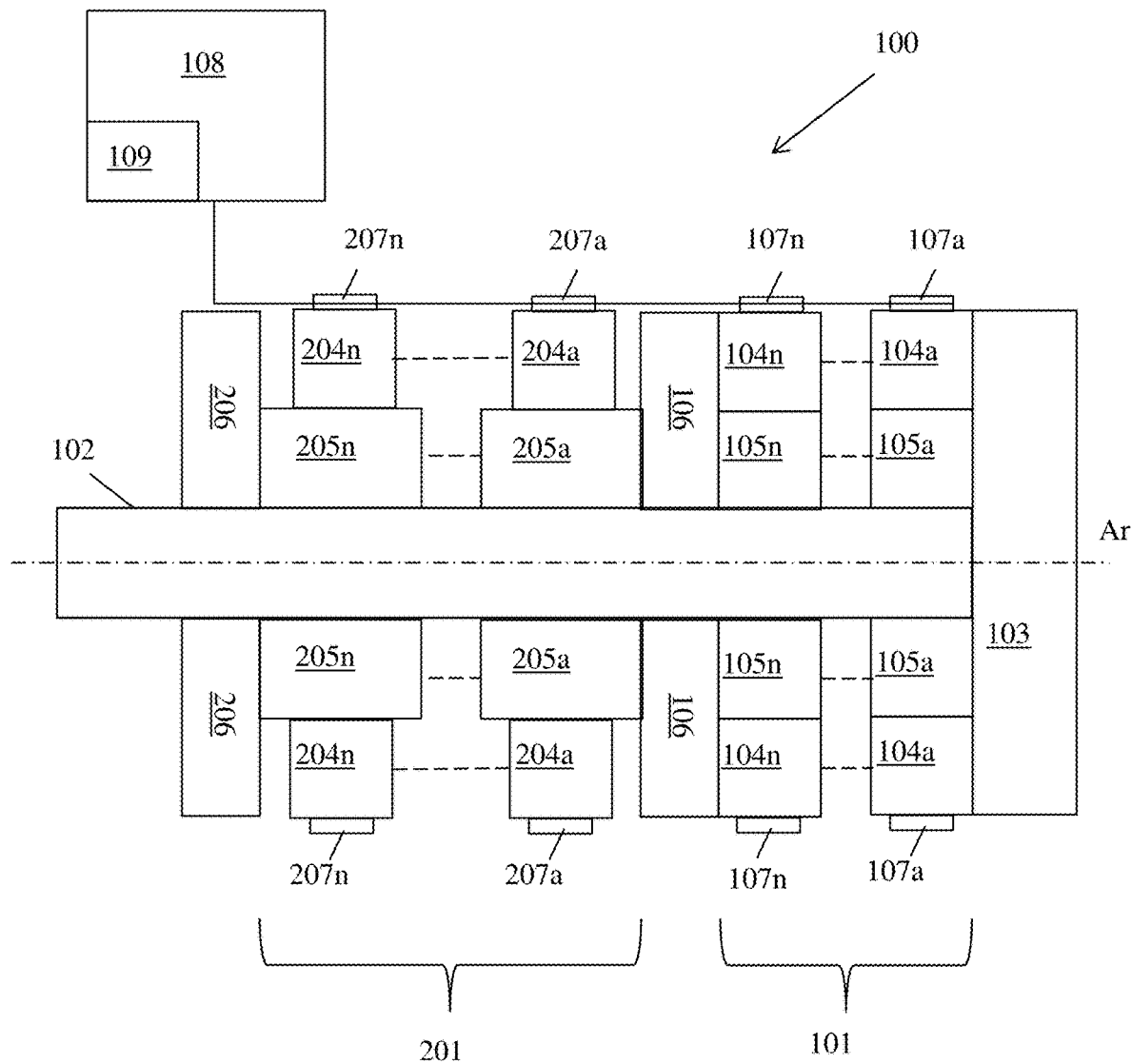
FIGS. 3A and 3B illustrate a cross-sectional side view of an actuation device in accordance with one or more embodiments of the present disclosure.
Figure 3B:
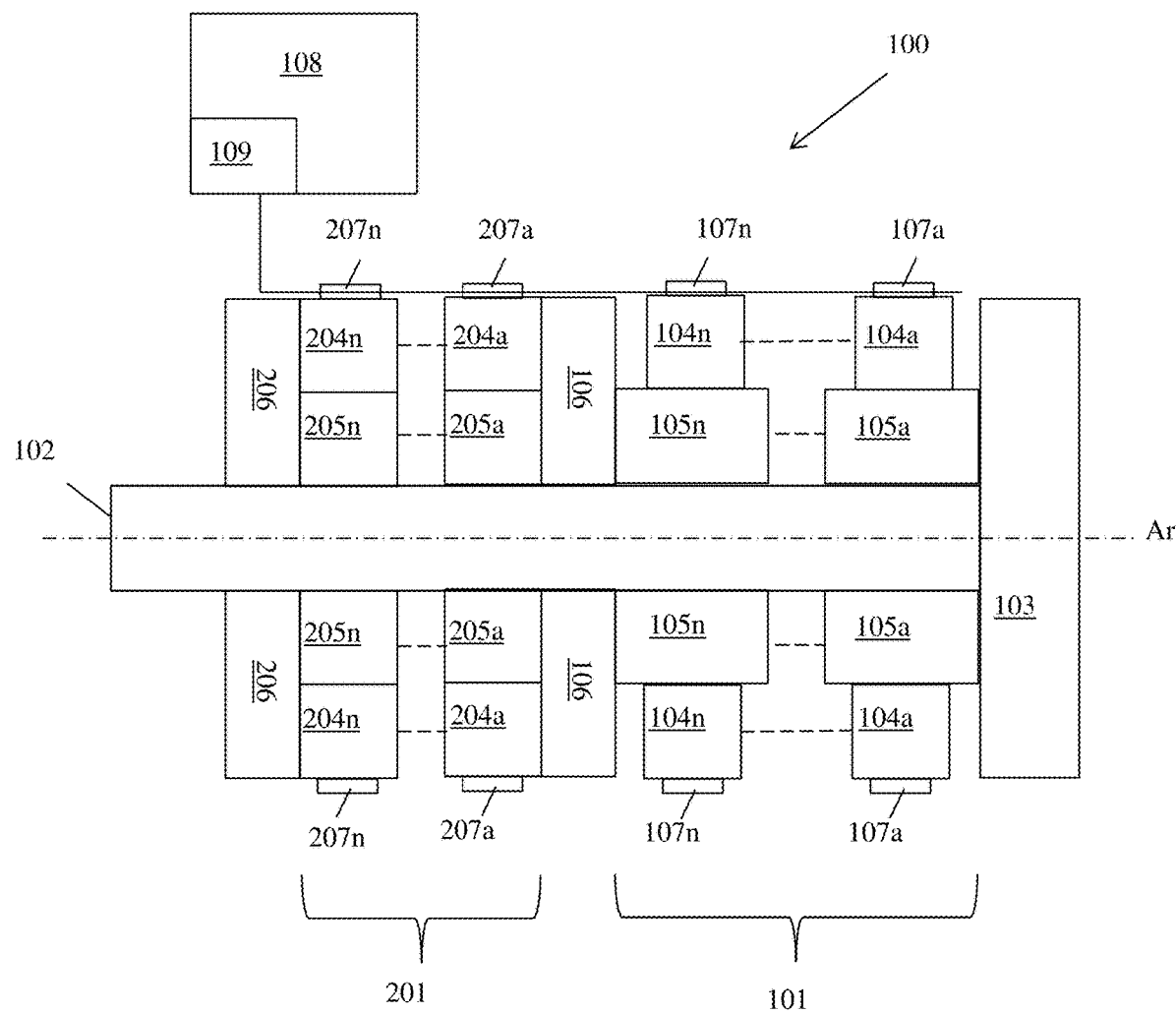

Referring now to FIGS. 3A and 3B, another embodiment of an actuation device according to embodiments herein is illustrated, where like numerals represent like parts. The embodiment of FIGS. 3A and 3B are similar to that of the embodiment of FIGS. 2A-2E. However, in addition to the stack of actuation disks 101, the actuation device 100 of FIGS. 3A and 3B may include a second stack of actuation disks 201 to be a double acting stack actuator. The second stack of actuation disks 201 may be formed by a series of actuation disks (204a-204n, 205a-205n) stacked on top of each other (in a side-by-side configuration) similar to the first stack of actuation disks 101. The second stack of actuation disks 201 may be on an opposite side of the top plate 106 from the first stack of actuation disks 101. In such a configuration, the top plate 106 may act as a divider between the first stack of actuation disks 101 and the second stack of actuation disks 201. Additionally, a second top plate 206 may be at an end of the second stack of actuation disks 201 distal to the top plate 106. Further, the control system 108 may be operationally coupled to power sources 207a-207n for each actuation disk in the second stack of actuation disks 201, such that the control system 108 may control both stacks.

In one or more embodiments, one skilled in the art will appreciate how the actuation device 100 of FIGS. 3A and 3B may eliminate the need for preloaded compression springs in a fail-close actuation mode. A fail-close actuation mode may be provided in a double acting stack actuator by having reverse acting SMA components in the actuation units of each stack. For example, in the example shown in FIGS. 3A and 3B, a first stack of actuation disks may have SMA components 104a-104n that are in a non-displaced first position when unenergized (e.g., no power is provided to the actuation disks), and a second stack of actuation disks may have reverse acting SMA components 204a-204n that are in an expanded position when unenergized. When the first and second stacks of actuation disks are energized, the SMA components 104a-104n in the first stack may expand to a second position, thereby pulling the attached auxetic material components 105a-105n to an axially expanded position, and the SMA components 204a-204n in the second stack may retract, thereby removing the load from the attached auxetic material components 205a-205n and causing the auxetic material components to axially contract. In such manner, if there is a loss of power (or loss of other energy source), the actuation device 100 has a stack of actuation disks that may keep the actuation component in a closed position (e.g., to keep a valve closed) while in the unenergized state. In other embodiments, a single stack actuation device may have a fail-close mode by designing the stack of actuation units to move an actuation component in a closed position when in an unenergized state (e.g., the stack of actuation units may be expanded in an unenergized state and collapsed in an energized state).

In conventional methods, a safety system may be used to keep a valve closed when power or signal command is lost. If the pressure inside the valve body should ever fall below the ambient pressure outside (e.g., in subsea operations), the hydrostatic force may push on the valve stem, trying to push the valve gate to the open position. To resist this hydrostatic imbalance and any hydraulic head generated by the density of the fluid from a remote hydraulic power unit, conventional methods typically employ large and powerful springs, which may be dangerous to handle and install. Advantageously, using actuation mechanisms disclosed herein may eliminate the need for such springs. For example, the actuation device 100 shown in FIGS. 3A and 3B may use a double acting stack configuration to replace the need for return springs in subsea safety systems. Further, by eliminating the use of a hazardous compression spring from an actuator assembly altogether, the actuation device 100 may have further reductions in actuator envelope size.

In FIG. 3A, the first stack of actuation disks 101 may have each actuation disk 104a-104n, 105a-105n in a non-displaced position (the first position), while the second stack of actuation disks 201 may have each actuation disk 204a-204n, 205a-205n in an expanded position (the second position). The actuation disks 104a-104n, 105a-105n in the first stack and the actuation disks 204a-204n, 205a-205n in the second stack may be held in their respective positions without being energized by providing each stack with SMA components 104a-104n, 204a-204n having an initial shape that corresponds with the respective positions (e.g., SMA components 104a-104n having an initially non-displaced shape and SMA components 204a-204n having an initially expanded shape). In FIG. 3B, the control system 108 reverses the configuration to create a stroke in the actuation device 100. In a non-limiting example, the control system 108 may actuate, via the power source 107a-107n, the actuation disks 104a-104n, 105a-105n to the second position while the control system 108 moves the actuation disks 204a-204n, 205a-205n in the second stack to the first position. In FIG. 3B, the second stack of actuation disks 201 may be displaced out of the way of a valve opening to open the valve. As shown in FIG. 3A, when the actuation device 100 is de-energized, the second stack of actuation disks 201 may be expanded to close the valve opening. The actuation device 100 may then strength match the forces required to keep the valve closed. The opening portion of the actuation device 100 may be force sized to meet the valve force requirements.

The actuation device 100 of FIGS. 3A and 3B may reduce an overall force needed to ensure a valve closes in place of return springs in subsea safety systems. For example, in order to close the valve, the second stack of actuation disks 201 only needs to overcome a valve stem preference to push down (i.e., open the valve) when an external pressure (e.g., water depth pressure) exceeds the internal pressure inside the valve. Conventionally, a valve stem diameter is sized to be large enough to push the stem out (under internal pressure) to close the valve. As internal pressure inside the valve drops relative to the external pressure of the water depth, the valve eventually becomes susceptible to being opened by the outside pressure. The second stack of actuation disks 201 (e.g., acting as a "return" stack) only needs to be strong enough to provide enough return force energy to keep the valve step up (closed) even when 1 atmosphere of pressure is inside the valve. This is a much smaller force than conventional hydraulic pistons. Thus, the return force design of a return stack, e.g., in the actuation device 100 of FIGS. 3A and 3B, according to embodiments of the present disclosure may be kept smaller, and thus safer, than return force from a spring in a conventional hydraulic actuating device. In contrast to conventional hydraulic pistons, the actuation device 100 may also have a reduced envelop and design complexity. Further, the force to open the valve actuator pack does not have to be designed with a large opening force in the actuation device 100 because the actuation device 100 does not need to overcome a return spring force in addition to the force to open the valve (as found in conventional hydraulic pistons).

Figure 4A:
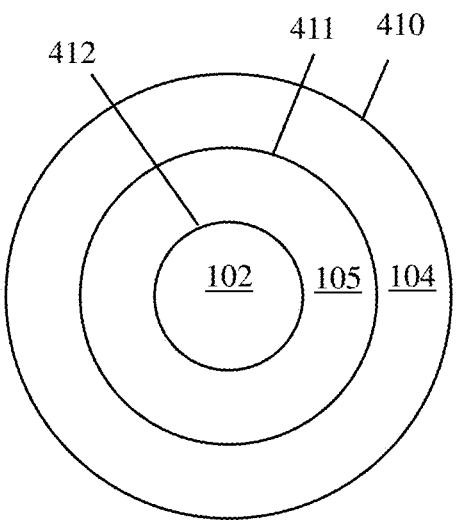
FIGS. 4A-4C illustrate a top view of an actuation disk of an actuation device in accordance with one or more embodiments of the present disclosure.

Turning to FIG. 4A, in one or more embodiments, FIG. 4A illustrates a top view of an actuation disk used in the actuation device 100 described above. A solid outer ring 410 may surround an outer perpetual edge of the SMA component 104. An optional segmented or expandable middle ring 411 may surround an inner perpetual edge of the SMA component 104 and an outer perpetual edge of the auxetic material component 105. The segmented or expandable middle ring 411 may be used to attach a free end of the SMA component 104 to a free end of auxetic material component 105. In other embodiments, the free end of the SMA component 104 may be attached to the free end of auxetic material component 105 by interweaving, crimping, welding, or gluing, the free ends together with or without the segmented or expandable middle ring 411. A solid inner ring 412 may surround an outer perpetual edge of the rod 102. Each of the rings 410-411 may be used to anchor the SMA component 104 and the auxetic material component 105. In a non-limiting example, the SMA component 104 may be anchored to the solid outer ring 410 and the segmented or expandable middle ring 411, such as by welding and/or using an adhesive, for example. Additionally, the auxetic material component 105 may be anchored to the segmented or expandable middle ring 411 and the solid inner ring 412, for example, by clamping, crimping, welding and/or using an adhesive. It is noted that the profile of the actuation disk is shown as a circle shape in FIG. 4A for example purposes only. The profile shape of the actuation disk may be any polygon (e.g., square, rectangle, triangle, pentagon, etc.), circle, or oval without departing from the scope of the present disclosure.

In one or more embodiments, the solid outer ring 410 and the solid inner ring 412 may be stationary (i.e., serving as anchor points) from which to react against when the SMA component 104 is exerting a force. In a non-limiting example, the segmented or expandable middle ring 411 may expand or contract radially as the SMA component 104 exerts a force during actuation. The radial movement (expanding or contracting) of the segmented or expandable middle ring 411 in turn pulls on or relaxes the auxetic material component 105, which is anchored on a side opposite the segmented or expandable middle ring 411 by the solid inner ring 412. It is further envisioned that the solid outer ring 410 and the solid inner ring 412 have a thickness and cross-sectional moment of inertia (I) to resist the reactive forces (i.e., no deflection) when the actuation disk is activated.

Figure 4B:
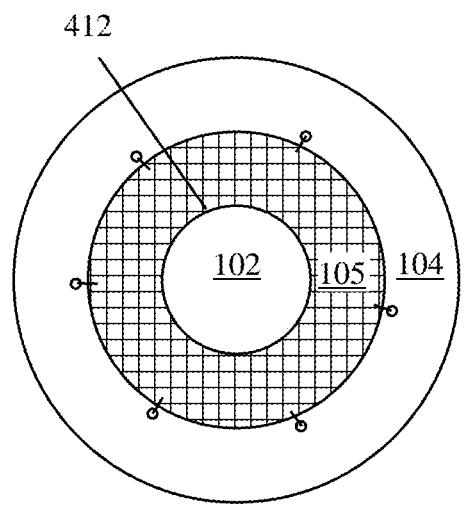
Figure 4C:
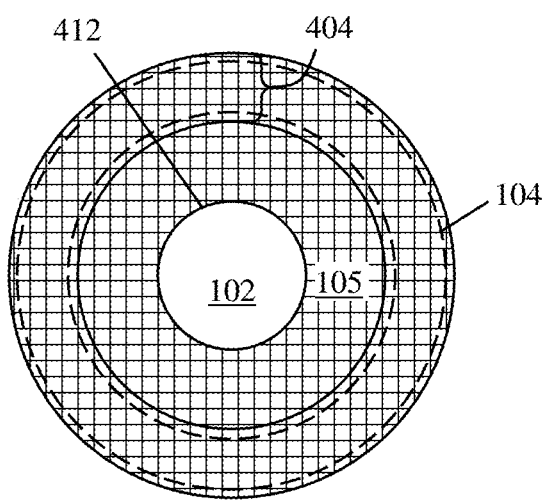

Further, depending on the material selection for the SMA component 104 and the auxetic material component 105, different attachment methods may be used to attach the auxetic material component 105. For example, FIGS. 4B and 4C show examples of an actuation disk having an auxetic material component 105 that is made of an auxetic material fabric. In such embodiments, an outer perimeter of the auxetic material component 105 may be woven around at least a portion of the SMA component 104. For example, as shown in FIG. 4B, an outer perimeter of the auxetic material component 105 may be woven through a perforated inner perimeter of the SMA component 104, and an inner perimeter of the auxetic material component 105 may be woven around a solid inner ring 412 surrounding the rod 102. As shown in FIG. 4C, the auxetic material component 105 may extend around the entire width of the SMA component 104 (represented in dashed lines), and an inner perimeter of the auxetic material component 105 may be woven around an inner ring 412 surrounding the rod 102. For example, an auxetic material component 105 may be sewn into a configuration having a sleeve around its outer perimeter, where the SMA component 104 may be held in the sleeve.

Figure 4D:
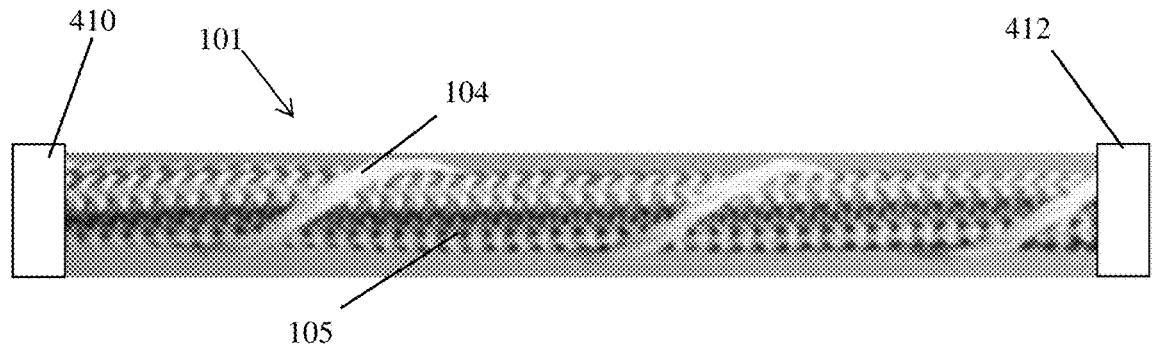
FIGS. 4D and 4E illustrate a cross-sectional side view of an actuation disk of an actuation device in accordance with one or more embodiments of the present disclosure.
Figure 4E:
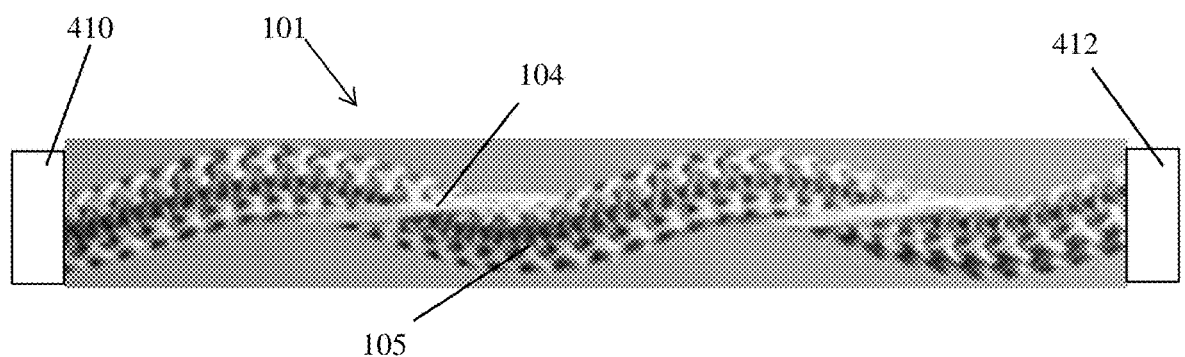
Figure 5A:
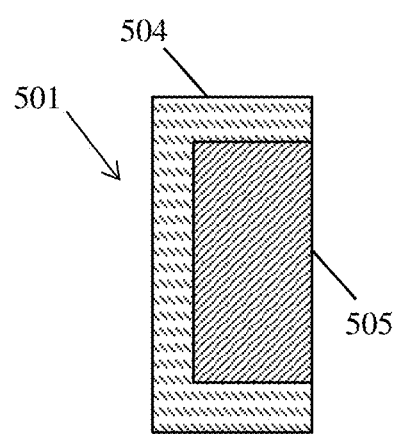
FIGS. 5A-5D illustrate a cross-sectional side view of an actuation device in accordance with one or more embodiments of the present disclosure.
Figure 5B:
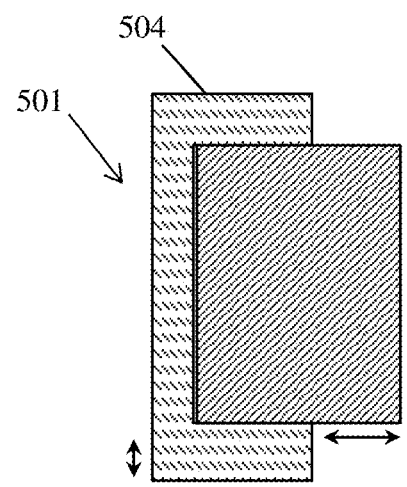
Figure 5C:
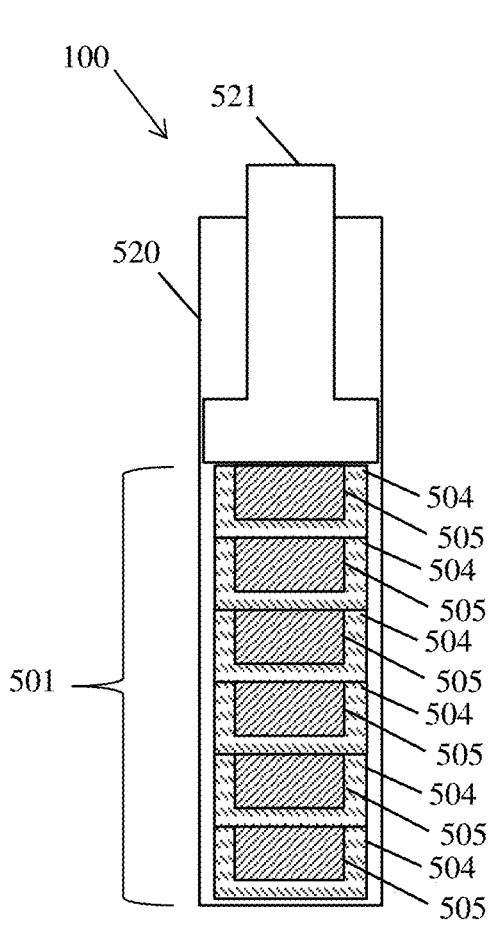
Figure 5D:
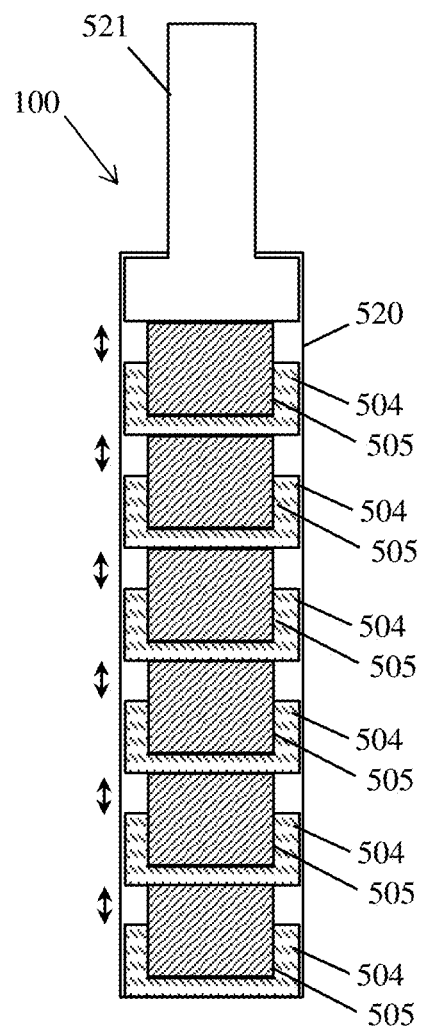

FIGS. 4D and 4E show examples of an actuation disk 101 having an auxetic material component 105 operationally coupled to a SMA component 104 by interweaving the components 104, 105 together. Both the SMA component 104 and the auxetic material component 105 may be anchored at one end to the inner ring 412 and at another end to the outer ring 410. In FIG. 4D, the actuation disk 101 is in a relaxed state while in FIG. 4E, the actuation disk 101 is in an energized state. The SMA component 104 may be wrapped around the auxetic material component 105 in a helical pattern. For example, the SMA component 104 may be helically coiled around and attached to the auxetic material component 105 in the relaxed state, such that the two components 104, 105 do not move relative to each other. In the relaxed state, an effective diameter of the entire actuation disk 101 may be equal to a diameter of the auxetic material component 105 plus twice a diameter of the SMA component 104. When the SMA component 104 is energized, a dramatic shape change occurs to the actuation disk 101 due to the negative Poisson ratio of the auxetic material component 105. During energizing, the helically wound SMA component 104 straightens in an axial direction. In this process, the auxetic material component 105 is pushed by the SMA component 104 and twisted along the attached side of the SMA component 104, as shown in FIG. 4E. As a result, the auxetic material component 105 helically coils around the SMA component 104 (as opposed to the condition in the relaxed state) and extends in a perpendicular direction to the axial direction. In the energized state, the effective diameter of the actuation disk 101 may be equal to the diameter of the SMA component 104 plus twice the diameter of the auxetic material component 105.

Other configurations of actuation units may be assembled by attaching an auxetic material component to an SMA component. For example, actuation units may be configured in a third-degree lever configuration or a four-bar linkage configuration, where a small displacement and large force may be generated by the SMA component, and the auxetic material component may have a long lever arm geometric configuration to provide the large displacement.

As shown in FIGS. 5A-5D, an SMA component 504 may be attached around a portion of an outer perimeter of an auxetic material component 505 (e.g., where the SMA component 504 may be attached at least at opposite sides of the auxetic material component 505 such that the SMA component 504 may pull the auxetic material component 505 during shape change). In embodiments where actuation units 501 do not have a central hole for slidably fitting around a rod (e.g., actuation units 501 having a solid SMA component 504 and an attached auxetic material component 505), the solid actuation units 501 may be stacked in a side-by-side configuration within a tubular or otherwise hollow actuation chamber 520. The outer perimeter of each solid actuation unit 501 may slidably fit within the actuation chamber 520, such that when the solid actuation units 501 are energized, the solid actuation units 501 may move through the actuation chamber 520 in an axial direction to provide a collective stroke length to a piston 521.

As another example of another actuation unit configuration, a solid SMA component may be attached adjacent to an auxetic material component (e.g., made of an auxetic foam or fabric), where shape change of the solid SMA component may push or pull the attached auxetic material from another component. For example, an auxetic material component may be attached at one side to an SMA component and at an opposite side to a second component (e.g., part of an actuation chamber in which the actuation units may be stacked, an outer ring such as shown in FIG. 4A, or a second metallic component attached to the SMA component), where the shape change of the SMA component may pull the auxetic material component away from the second component or push the auxetic material component toward the second component, thereby activating the auxetic material to expand/retract in the perpendicular direction from which the SMA component pushed/pulled the auxetic material.

Actuation units may have an SMA component operationally coupled to an auxetic material component in different configurations such that when the SMA component changes shape, the SMA component may generate a force on the auxetic material component. Further, actuation units may be configured such that when arranged in a side-by-side configuration to form a stack of actuation units, the SMA components may generate a force on the auxetic material component that is perpendicular to the axial direction of the stack, such that the auxetic material components in the stack may expand in the axial direction of the stack.

For example, a stack of actuation units may include a plurality of actuation units that each have a configuration of an SMA component operationally coupled to an auxetic material component (e.g., directly attached or coupled in combination with a second component), wherein the SMA component and coupled auxetic material component in each actuation unit has a first position shape when power is not provided to the SMA component, and wherein the SMA component and coupled auxetic material component in each actuation unit has a second position shape when power is provided to the SMA component. When the SMA component changes shape between the first position and the second position, a force on the coupled auxetic material component may be generated in a perpendicular direction to the axial dimension of the stack of actuation units. In response to the generated force, the auxetic material component may expand (or contract) in the axial direction.

Each actuation unit in the stack may have a stroke length measured by a change in dimension of the auxetic material component when the auxetic material component moves between the first position shape and the second position shape. According to embodiments of the present disclosure, the stroke length of each actuation unit may be at least twice as long as a change in dimension of the SMA component when the SMA component moves between the first position shape and the second position shape. Thus, the auxetic material component in an actuation unit may act as a multiplier of the movement that may be generated from activating the SMA component.

A collective stroke length of a stack of actuation units may be calculated as the sum of the stroke lengths of each actuation unit in the stack having a change in dimension. In other words, when actuation unit(s) in a stack of actuation units are activated to change shape (e.g., by energizing the SMA component in each actuation unit to generate a force on the coupled auxetic material and expand the auxetic material component in a direction perpendicular to the generated force), the collective stroke length of the stack may be the sum of the stroke lengths of each actuation unit activated to change shape. In a non-limiting example, the Poisson ratio of the auxetic material may determine the stroke length of actuation disk(s) such that the larger the negative Poisson ratio, the auxetic material provides more of a multiplication factor.

In some embodiments, the collective stroke length of a stack of actuation units may be calculated as the difference between the axial length of the energized stack of actuation units (i.e., when at least one actuation unit in the stack is energized) and the axial length of the unenergized stack of actuation units (i.e., when none of the actuation units in the stack are energized). The collective stroke length of a stack of actuation units may depend on, for example, the number of actuation units that are energized and the stroke length of each actuation unit. According to embodiments of the present disclosure, when each actuation unit in a stack of actuation units is energized, the collective stroke length of the energized stack of actuation units may be at least 50%, at least 75%, or greater than 100% the axial length of the unenergized stack of actuation units. According to some embodiments, when each actuation unit in a stack of actuation units is energized, the axial length of the energized stack of actuation units may be greater than 1.3, greater than 1.5, or greater than 2 times the axial length of the unenergized stack of actuation units.

In another aspect, embodiments herein relate to a method of operating actuation devices, such as the actuation device 100 of FIGS. 2A-5C. The operations of the actuation device 100 may be performed by one or more components (e.g., the control system 108 coupled to a controller in communication with a server network). For example, a non-transitory computer readable medium may store instructions on a memory coupled to a processor such that the instructions include functionality for operating the actuation device 100. The method may include actuating a shape memory alloy of one or more actuation units (e.g., SMA components 104) via a power source operationally coupled to the SMA component. By actuating the shape memory alloy, an auxetic material component of the one or more actuation units is pulled with a force generated from actuating the SMA component. In response to the SMA generated force, the auxetic material component expands in a direction perpendicular to the force generated by the SMA component. The method may further include displacing the auxetic material component from a first position to a second position to form a stroke length of the one or more actuation units. The method may also include reciprocating the auxetic material component back and forth from the first position and the second position. Additionally, the auxetic material component may be displaced to a third position between the first position and the second position. In some embodiments, the auxetic material component may cascade (e.g., continuous expansion movement) from the first position to the third position and then to the second position. When the auxetic material component is fully expanded in the second position, a top plate on the one or more actuation units may engage with a flow control device such as a valve, choke, metering/throttling valve, and other flow devices. Further, the method may include controlling, with a control system, a rate at which the auxetic material component displaces from the first position to the second position.

In yet another aspect, embodiments herein relate to a method of assembling an actuation device, such as the actuation device 100 of FIGS. 2A-5C. The method may include assembling a plurality of actuation units. Each actuation unit may be assembled by anchoring a SMA component to an outer ring and a segmented or expendable middle ring. Each actuation unit may be further assembled by anchoring an auxetic material to the segmented or expendable middle ring and an inner ring. Further, a power source may be wrapped around the outer ring. With both the SMA material component and the auxetic material anchored, a tubular or washer-shaped actuation unit may be assembled, which may then be slidably disposed around a rod.

Washer-shaped actuation units such as actuation disks shown in FIGS. 2A-5C may be slidably disposed about a rod such that an inner surface of the inner ring slides down an outer surface of the rod to rest a first actuation disk against a back stop. Each actuation disk may be stacked upon each other to form a stack of actuation disks about the rod. In some embodiments, the stack of actuation disks may be formed first and then slidably disposed about the rod. With the stack of actuation disks slidably disposed about the rod, a top plate may be installed on an upper most actuation disk of the stack of actuation disks. The method may further include coupling a control system to each power source of the actuation device.

Figure 6:
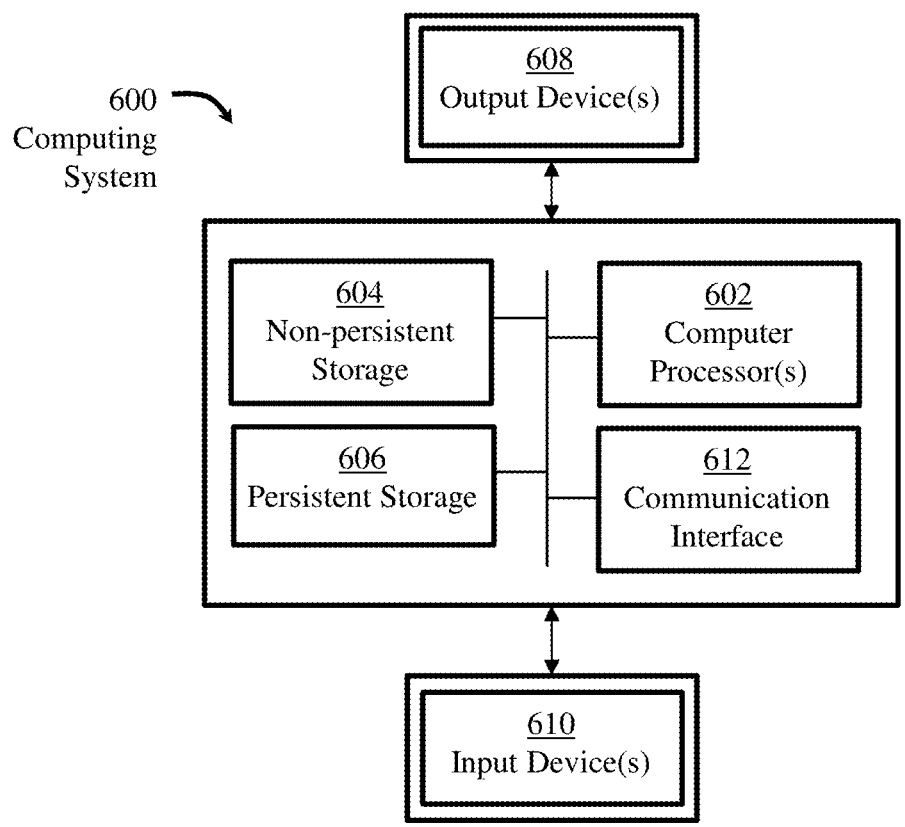
FIG. 6 is a schematic diagram of a computing system in accordance with embodiments disclosed herein.

Implementations herein for operating the actuation device 100 may be implemented on a computing system coupled to a controller in communication with the various components of an actuation device (e.g., actuation device 100). Any combination of mobile, desktop, server, router, switch, embedded device, or other types of hardware may be used with the actuation device. For example, as shown in FIG. 6, the computing system 600 may include one or more computer processors 602, non-persistent storage 604 (e.g., volatile memory, such as random access memory (RAM), cache memory), persistent storage 606 (e.g., a hard disk, an optical drive such as a compact disk (CD) drive or digital versatile disk (DVD) drive, a flash memory, etc.), a communication interface 612 (e.g., Bluetooth interface, infrared interface, network interface, optical interface, etc.), and numerous other elements and functionalities. It is further envisioned that software instructions in a form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. For example, the software instructions may correspond to computer readable program code that, when executed by a processor(s), is configured to perform one or more embodiments of the disclosure (e.g., energizing one or more actuation units in an actuation device).

The computing system 600 may also include one or more input devices 610, such as a touchscreen, keyboard, mouse, microphone, touchpad, electronic pen, or any other type of input device. Additionally, the computing system 600 may include one or more output devices 608, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 602, non-persistent storage 604, and persistent storage 606. Many different types of computing systems exist, and the input and output device(s) may take other forms.

The computing system 600 of FIG. 6 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model. For example, a GUI may first obtain a notification from a software application requesting that a particular data object be presented within the GUI. Next, the GUI may determine a data object type associated with the data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the data object and render a visual representation of the data values within a display device according to the designated rules for that data object type.

Data may also be presented through various audio methods. Data may be rendered into an audio format and presented as sound through one or more speakers operably connected to a computing device. Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. An actuation device comprising:
a plurality of actuation units disposed about an axis, wherein each actuation unit of the plurality of actuation units comprises:
a shape memory alloy component;
an auxetic material component operationally coupled to the shape memory alloy component; and
a power source operationally coupled to the shape memory alloy component; and
a control system operationally coupled to the power source, wherein the control system is configured to actuate the shape memory alloy component through the power source,
wherein when actuated, the shape memory alloy component moves in a direction outward from the axis to pull the auxetic material component, and the auxetic material component expands in a direction perpendicular to the movement direction of the shape memory alloy component.

2. The actuation device of claim 1, wherein the each of the actuation unit of the plurality of actuation units comprises:
a first position, wherein the power source is turned off;
a second position, wherein the power source is turned on to a power level to fully extend the auxetic material component; and
a third position, wherein the power source is turned on to a power level to extend the auxetic material component a distance between the first position and the second position.

3. The actuation device of claim 1, wherein the each of the actuation unit of the plurality of actuation units are stacked upon each other to form a first stack of actuation units, and wherein a second stack of actuation units are disposed about the axis adjacent the first stack of actuation units.

4. The actuation device of claim 1, further comprising:
a back stop at an end of a rod or chamber, wherein the rod or the chamber is coaxial with the plurality of actuation units, and the plurality of actuation units rest against the back stop; and
a top plate disposed on the plurality of actuation units distal to the back stop.

5. The actuation device of claim 1, wherein the power source is mechanical, acoustic, thermal, hydraulic, chemical, electro-magnetic, nuclear, or a combination thereof.

6. The actuation device of claim 1, wherein the each of the actuation unit of the plurality of actuation units comprises an outer ring, an expandable middle ring, and an inner wall, wherein the shape memory alloy component is anchored to the outer ring and the expandable middle ring, and the auxetic material component is anchored to the expandable middle ring and the inner ring.

7. An actuation device comprising:
a stack of actuation units comprising a plurality of actuation units assembled in a side-by-side configuration, wherein each actuation unit comprises:
a shape memory alloy component; and
an auxetic material component operationally coupled to the shape memory alloy component; and
a power source operationally coupled to the shape memory alloy component in the each of the actuation unit;
wherein the shape memory alloy component and the coupled auxetic material component in the each of the actuation unit has a first position shape when the power source does not provide power to the shape memory alloy component, and
wherein the shape memory alloy component and coupled auxetic material component in each actuation unit has a second position shape when the power source provides power to the shape memory alloy component.

8. The actuation device of claim 7, wherein the stack of actuation units is held in an actuation chamber and movable within the actuation chamber along an axial direction.

9. The actuation device of claim 8, wherein the shape memory alloy component in the each of the actuation unit is operationally coupled to the auxetic material component in a configuration that when changing between the first and second position shapes generates a force on the auxetic material component that is perpendicular to the axial direction.

10. The actuation device of claim 7, wherein an axial end of the stack of actuation units is operationally coupled to an actuation component in a flow control device.

11. The actuation device of claim 7, wherein the each of the actuation unit further comprises a second component attached to the shape memory alloy component, wherein the auxetic material component is attached at opposite sides to the shape memory alloy component and the second component.

12. The actuation device of claim 7, wherein the each of the actuation unit has a stroke length measured by a change in dimension of the auxetic material component between the first position shape and the second position shape, and wherein a collective stroke length of the stack of actuation units is the sum of the stroke lengths of each actuation unit having the change in dimension.

13. The actuation device of claim 12, wherein the stroke length of each actuation unit is at least twice as long as a change in dimension of the shape memory alloy component between the first position shape and the second position shape.

14. A method comprising:
actuating a shape memory alloy component of one or more actuation units via a power source operationally coupled to the shape memory alloy component;
pulling an auxetic material component of the one or more actuation units with a force generated from actuating the shape memory alloy component;
expanding the auxetic material component in a direction perpendicular to the force generated by the shape memory alloy component; and
displacing the auxetic material component from a first position to a second position to form a stroke length of the one or more actuation units.

15. The method of claim 14, further comprising displacing the auxetic material component to a third position between the first position and the second position.

16. The method of claim 15, further comprising cascading the auxetic material component from the first position to the third position and then to the second position.

17. The method of claim 14, further comprising engaging a flow control device with a top plate on the one or more actuation units.

18. The method of claim 14, further comprising controlling, with a control system, a rate at which the auxetic material component displaces from the first position to the second position.

19. A method, comprising:
providing an actuation device comprising a plurality of actuation units assembled in a side-by-side configuration;
actuating a shape memory alloy component of a portion of the actuation units via a power source operationally coupled to the shape memory alloy component;
pulling an auxetic material component of the portion of the actuation units with a force generated from actuating the shape memory alloy component;
displacing the auxetic material component in the portion of the actuation units from a first position, in a direction perpendicular to the force generated by the shape memory alloy component, to a second position; and
maintaining the auxetic material component of a remaining portion of the actuation units in the first position;
wherein displacing the auxetic material component in the portion of the actuation units forms a partial stroke length of the actuation device.

20. The method of claim 19, wherein maintaining the auxetic material component in the first position comprises turning off the power source in each actuation unit of the remaining portion of the plurality of actuation units.

21. The method of claim 19, further comprising actuating the shape memory alloy component of the remaining portion of the actuation units to displace the auxetic material component of the remaining portion of the actuation units from the first position to the second position to form a full stroke length of the actuation device.

22. A method comprising:
providing an actuation device comprising a plurality of actuation units, each actuation unit having a shape memory alloy component and an auxetic material component;
actuating a first stack of the plurality of actuation units to an energized state, wherein the actuating comprises:
 actuating the shape memory alloy component of each actuation unit in the first stack via a power source;
 pulling the auxetic material component of the each of the actuation unit in the first stack with a force generated from actuating the shape memory alloy component; and
 displacing the auxetic material component in a direction perpendicular to the force generated by the shape memory alloy component from a first position to a second position;
maintaining a second stack of the plurality of actuation units in a rest state, wherein in the rest state, the auxetic material component of each actuation unit in the second stack is in the first position, wherein the second stack is proximate the first stack;
turning off the power source of the each of the actuation unit in the first stack to return the auxetic material component of the each of the actuation unit in the first stack to the first position and placing the first stack of actuation units in the rest state; and
actuating the second stack of actuation units to an energized state, wherein the actuating comprises:
 actuating the shape memory alloy component of each actuation unit in the second stack via the power source;
 pulling the auxetic material component of each actuation unit in the second stack with a force generated from actuating the shape memory alloy component; and
 displacing the auxetic material component in a direction perpendicular to the force generated by the shape memory alloy component from the first position to the second position.

23. The method of claim 22, further comprising controlling, with a control system, a rate at which the first stack of actuation units and the second stack of actuation units reciprocate from the energized state and the rest state.

24. An actuation device comprising:
a first stack of actuation units comprising a plurality of first actuation units assembled in a side-by-side configuration, wherein each of the first actuation units comprises:
 a first shape memory alloy component; and
 a first auxetic material component operationally coupled to the first shape memory alloy component;
 wherein the first shape memory alloy component and coupled first auxetic material component in the each of the first actuation unit has an expanded shape when a power source does not provide power to the first shape memory alloy component; and
 wherein the first shape memory alloy component and coupled first auxetic material component in the each of the first actuation unit has a retracted shape when the power source provides power to the first shape memory alloy component; and
a second stack of actuation units comprising a plurality of second actuation units assembled in a side-by-side configuration, wherein each of the second actuation units comprises:
 a second shape memory alloy component; and
 a second auxetic material component operationally coupled to the second shape memory alloy component;
 wherein the second shape memory alloy component and coupled second auxetic material component in the each of the second actuation unit has a second retracted shape when a power source does not provide power to the second shape memory alloy component; and
 wherein the second shape memory alloy component and coupled second auxetic material component in the each of the second actuation unit has a second expanded shape when the power source provides power to the second shape memory alloy component.

25. The actuation device of claim 24, wherein the actuation device is a fail-close actuator having the first stack and the second stack operationally coupled to a flow control device, wherein the flow control device is closed when the power source does not provide power to the first and second shape memory alloy components.

* * * * *